United States Patent
Rouveyre

(10) Patent No.: US 10,930,947 B2
(45) Date of Patent: Feb. 23, 2021

(54) RECIRCULATION DEVICE OF A FUEL CELL

(71) Applicant: SymbioFCell, Grenoble (FR)

(72) Inventor: Luc Rouveyre, Chambery (FR)

(73) Assignee: SYMBIOFCELL, Grenoble (FR)

(*) Notice: Subject to any disclaimer, the term of this patent is extended or adjusted under 35 U.S.C. 154(b) by 597 days.

(21) Appl. No.: 15/039,969

(22) PCT Filed: Dec. 1, 2014

(86) PCT No.: PCT/EP2014/076130
§ 371 (c)(1),
(2) Date: Nov. 7, 2016

(87) PCT Pub. No.: WO2015/079066
PCT Pub. Date: Jun. 4, 2015

(65) Prior Publication Data
US 2017/0054162 A1    Feb. 23, 2017

(30) Foreign Application Priority Data

Nov. 29, 2013  (FR) ..................................... 13 61864

(51) Int. Cl.
*H01M 8/04111* (2016.01)
*H01M 8/04119* (2016.01)
(Continued)

(52) U.S. Cl.
CPC ...... *H01M 8/04111* (2013.01); *H01M 4/0438* (2013.01); *H01M 8/0432* (2013.01);
(Continued)

(58) Field of Classification Search
None
See application file for complete search history.

(56) References Cited

U.S. PATENT DOCUMENTS

| 2003/0219636 A1 | 11/2003 | Kaufmann |
| 2006/0134495 A1 | 6/2006 | Gallagher |

(Continued)

FOREIGN PATENT DOCUMENTS

| DE | 20210130 U1 | 3/2004 |
| EP | 1 902 954 A2 | 3/2008 |

(Continued)

OTHER PUBLICATIONS

Office action for European Patent Application No. 14806601.2-1809, dated Dec. 11, 2017.
(Continued)

*Primary Examiner* — Lucas J. O'Donnell
(74) *Attorney, Agent, or Firm* — Pearne & Gordon LLP

(57) ABSTRACT

The invention relates to a supply circuit of the cathode (250) of at least one electrochemical cell (200) of the PEMFC type, which further comprises a membrane (290) separating an anode (210) and said cathode (250), with this circuit comprising:
  a supply channel (220) comprising an inlet (282) and making it possible to convey a fluid (90) in contact with the cathode (250);
  a discharge channel (280) that makes it possible to remove gases from the cell,
  a recirculation channel (100, 100'), comprising:
    a first opening (102) connected to the outlet (284) of the discharge channel (280);
    a second opening (104) connected to the inlet (282) of the supply channel (280), by the intermediary of a connector (80);
    a third opening (106) and means for removing (140) that allow at least one portion of the fluid (90) to be removed from the recirculation channel by the third opening (106), (Continued)

the recirculation channel (100, 100') and/or the supply channel further comprising at least one compressor (C1, C2), which makes it possible to control the flow rates and/or the proportion of the fluids to be mixed in the connector.

15 Claims, 9 Drawing Sheets

(51) Int. Cl.

| | | |
|---|---|---|
| *H01M 8/04746* | (2016.01) | |
| *H01M 8/04701* | (2016.01) | |
| *H01M 8/0432* | (2016.01) | |
| *H01M 8/04089* | (2016.01) | |
| *H01M 8/04537* | (2016.01) | |
| *H01M 4/04* | (2006.01) | |
| *H01M 8/04276* | (2016.01) | |
| *H01M 8/1018* | (2016.01) | |
| *H01M 8/04828* | (2016.01) | |
| *H01M 8/04858* | (2016.01) | |

(52) U.S. Cl.
CPC ... *H01M 8/04097* (2013.01); *H01M 8/04126* (2013.01); *H01M 8/04276* (2013.01); *H01M 8/04365* (2013.01); *H01M 8/04537* (2013.01); *H01M 8/04544* (2013.01); *H01M 8/04701* (2013.01); *H01M 8/04753* (2013.01); *H01M 8/04776* (2013.01); *H01M 8/1018* (2013.01); *H01M 8/04835* (2013.01); *H01M 8/04865* (2013.01); *H01M 2008/1095* (2013.01); *H01M 2250/10* (2013.01); *H01M 2250/20* (2013.01); *Y02B 90/10* (2013.01); *Y02T 90/40* (2013.01)

(56) References Cited

U.S. PATENT DOCUMENTS

| | | | | |
|---|---|---|---|---|
| 2009/0220832 | A1* | 9/2009 | Reiser | H01M 8/04753 429/415 |
| 2012/0214077 | A1* | 8/2012 | Garrettson | H01M 8/04014 429/429 |
| 2015/0288041 | A1* | 10/2015 | Forte | H01M 8/04201 429/9 |

FOREIGN PATENT DOCUMENTS

| | | |
|---|---|---|
| GB | 2 442 252 A | 4/2008 |
| WO | 99/65090 A2 | 12/1999 |

OTHER PUBLICATIONS

Search Report issued in French Patent Application No. FR 13 61864 dated Aug. 25, 2014.
International Search Report issued in Application No. PCT/EP2014/076130 dated Feb. 2, 2015.
Written Opinion issued in Application No. PCT/EP2014/076130 dated Feb. 2, 2015.
Thèse de M. Marielle Marchand : « Gestion de l'eau dans les piles à combustible », Institut Polytechnique de Grenoble, le Nov. 13, 1998).
Article de J. P. Meyers et al.: « Model of Carbon Corrosion in PEM Fuel Cells », Journal of the Electrochemical Society, 153 (8) A1432-A1442 (2006).
Article de Roen et al.: « Electrocatalytic Corrosion of Carbon Support in PEMFC Cathodes », Electrochemical and Solid-State Letters, 7(1), A19-A22 (2004)).
Article de Woojin et al:. « Development of an Equivalent Canal Model of a Fuel Cell to Eliminate the effects of Inverter Ripple Current », 0-7803-8269-2/04 (C) 2004 IEEE.
Article de Randall: "Analysis for the Effect of Inverter Ripple Current on Fuel Cell Operating Condition", Journal of Fluids Engineering, May 2003, vol. 125, Issue 3, pp. 576-585, doi: 10.1115/1.1567307).

* cited by examiner

RECIRCULATION DEVICE OF A FUEL CELL

TECHNICAL FIELD

The technical field of the invention is that of fuel cells. This application relates to a device and its method of use in order to optimise the operation of this type of cell, more particularly during rapid transitions between different operating states. The invention can therefore be used for stationary fuel cells, or more advantageously on-board fuel cells.

PRIOR ART

A fuel cell is an electrochemical device delivering an electric power, of the direct type, to a customer environment. The device responds to a solicitation from this environment. The response is of the voltage or current type for a solicitation respectively of the current or voltage type. The electric power is produced by a production module 10, comprising at least one electrochemical cell supplied using a storage module 6, with fuel 2 and combustion agent 4 (FIG. 1). The combustion agent can for example be comprised of ambient air. An electrochemical cell is comprised of the following compartments or elements:
- an anode 12 making it possible to oxidise the fuel 2;
- a cathode 14 making it possible to reduce the combustion agent 4;
- a proton or electrolyte exchange membrane 16, interposed between the cathode and the anode, ensuring primarily the transfer of the molecules of oxidised fuel;
- a heat exchanger (18) connected to a cooling device (50).

The membrane 16, also called PEMFC for "Proton Exchange Membrane Fuel Cell", makes it possible to physically separate the fuel from the combustion agent when they are introduced into their respective compartment in the electrochemical cell. For example, for a fuel cell of the PEMFC type the fuel is hydrogen, the combustion agent is oxygen.

The hydrogen in contact with the anode, releases electrical charges and protons:

$$H_{2(g)} \rightarrow 2H^{+}_{(g)} + 2e^{-} \quad (1)$$

The membrane of the PEMFC plays the role of an electrolyte, ensuring the transport of the $H^+$ ions from the anode to the cathode. The reactants, coming from the fuel and combustion agent, are then grouped together on the catalytic sites of the cathodic electrode and react according to the following reaction:

$$O_{2(g)} + 2H^{+}_{(g)} + 2e^{-} \rightarrow H_2O_{(g)} \quad (2)$$

The electrical charges required for this reaction (2) come from the reaction (1). The electrical charges migrate from the anode to the cathode by the intermediary of a conductive device or a customer environment 20, connected to the terminals of the production module 10.

As such, a cell can be constituted by a stack of electrochemical cells connected electrically in series. Each electrochemical cell is connected in parallel to different supply connectors, delivering the combustion agent, the fuel and possibly a fluid that makes it possible to cool said cell. Separate discharge collectors make it possible to remove the product of the reactions, the combustion agent, whether or not consumed, and the fluid transporting a portion of the heat produced by the electrochemical cell.

The output in electricity of the electrochemical cell depends among other things on its temperature.

For example, the output of the reaction (2) is optimal in a temperature range between 50° C. and 70° C. (thesis of Mr Marielle MARCHAND, entitled "Management of water in fuel cells, Institut Polytechnique de Grenoble, 13 Nov. 1998).

However, beyond ambient temperature, the PEMFC 16 dries out under the combined effect of the temperature and of the gases flowing in the electrochemical cell if the latter are not humidified. These dry zones, also called dead zones, no longer allow the protons to diffuse through the PEMFC. The reaction (2) is therefore stopped on these zones.

On the contrary, an excessive rate of humidity of the gases supplying the fuel cell favours the deposit of a liquid film on the surface of the electrodes, impermeable to said gases and favours oxidation of the support of the electrodes. Again the electrochemical reaction is stopped on surfaces of the electrodes which are covered with water.

In order to prevent these phenomena, a fuel cell comprises an auxiliary humidification device 32 that makes it possible to control the rate of humidification of the combustion agent injected into the cathode 14.

The disadvantages of this device are its bulkiness and the fact that it consumes, directly or indirectly, a portion of the electricity produced by the production module 10.

A fuel cell is more exposed to one of the preceding phenomena when its customer environment 20 solicits variations in electrical power demand of substantial amplitudes over a short interval of time, in particular during the starting up of the cell. In order to dampen the effects of these abrupt variations of electric power, the cell is placed on stand-by according to the possibilities of the customer environment, or hybridisation, wherein it is integrated. In this stand-by mode, the fuel cell delivers an electrical current that makes it possible to supply only the auxiliary modules required to maintain the cell on stand-by: supply compressor (36) with combustion agent, hydrogen pump (42), cooling pump (54), means for controlling. The cooling pump (54) belongs to a cooling device (50) that comprises a heat exchanger (56), with the whole being connected to the heat exchanger (18). The heat exchanger 18 internal to the electrochemical cells allow for the thermal management of it in order to guarantee the sustainability thereof. Indeed, the thermal power induced by the electrochemical irreversibilities is removed by the cooling circuit 50 to the outside environment by the intermediary of the exchanger 18.

The means 34 make it possible to condition the air exiting from the compressor in order to obtain an optimum operation of the humidification section 32. Normally this conditioning is of the thermal type and has for objective to maintain the temperature of the gases upstream of the means 32 under a level of saturation. In general these means 34 comprise a device of the "intercooler" or "radiator" type that uses the ambient air as a cold source.

Of course, this stand-by makes it possible to respond more quickly to a power ramp or to a sudden demand from the customer environment in relation to a production module initially stopped, but the low thermal power generated by the cell in this mode, does not make it possible to maintain the electrochemical cell in an operational temperature range that is ideal or optimum. A sudden demand for power can therefore expose the fuel cell to one of the preceding phenomena (drowning and/or drying) and compromise its integrity definitively (J. P. Meyers et al., "Model of Carbon Corrosion in PEM Fuel Cells", Journal of the Electrochemical Society, 153 (8) A1432-A1442 (2006); L. M. Roen et al., "Electrocatalytic Corrosion of Carbon Support in PEMFC Cathodes", Electrochemical and Solid-State Letters, 7(1), A19-A22 (2004)).

In addition, for certain devices, primarily for economic reasons, a voltage converter 62 is interposed between the fuel cell and its customer environment 20. The voltage converter makes it possible to control the current or the power generated by the fuel cell, by decoupling its polarisation and/or de voltage curve of that of the customer network. One of the disadvantage of the converters is that they generate current oscillations, also called "ripple current", at the terminals of the cell. If these oscillations have an amplitude that is incompatible with its architecture, a definitive deterioration of the cell can take place, therefore reducing its performance and its service life (Woojin Choi et al. "Development of an Equivalent Canal Model of a Fuel Cell to Eliminate the effects of Inverter Ripple Current", 0-7803-8269-2/04 (C) 2004 IEEE; Randall S. Gemmen, "Analysis for the Effect of Inverter Ripple Current on Fuel Cell Operating Condition", Journal of Fluids Engineering, May 2003, Volume 125, Issue 3, pages 576-585, doi: 10.1115/1.1567307).

In addition, a voltage converter is cooled in order to sustain its components. In order to circulate a heat transfer fluid a cooling loop is added which integrates a heat exchanger 64, a cooling circuit, a fan-motor assembly (GNV) and a pump. Another possibility can consist in using a fan, in order to circulate the ambient air through a heat exchanger connected to the cooling circuit, of the fin type, making it possible to dissipate a portion of the thermal energy generated by the voltage converter 62.

A fuel cell therefore comprises in addition to the production module 10 and the storage module 6, auxiliary modules 30, 40, 50, 60 that are bulky and the consume a portion of the energy produced by the fuel cell, therefore reducing its output.

Once of the objectives of the invention is therefore to carry out a device that makes it possible to:
 maintain in stand-by mode a fuel cell in a temperature range that is optimum or ideal for its operation;
 and/or remove the current oscillations induced at the terminals of the fuel cell;
 and/or to reduce the bulkiness of the auxiliary devices ensuring its operation.

DISCLOSURE OF THE INVENTION

The invention makes it possible to overcome at least one of the preceding problems thanks to a supply circuit of an electrochemical cell comprising a membrane separating an anode and a cathode, or an electrochemical cell comprising a membrane separating an anode and a cathode, further comprising a supply channel internal to the fuel cell that allows a fluid circulating in the supply channel to be in contact with said cathode.

The cathode is of the closed type, i.e. it is supplied only by the supply channel.

A discharge channel internal to the fuel cell allows for the removal of the reactant or reactants distributed in the cell by the supply channel but which have not been consumed.

The cell comprises a supply channel and a discharge channel

A recirculation channel, delimited by a wall, entirely or at least partially sealed from the fluid, can comprise:
 a first opening connected to the outlet of the cathodic discharge channel,
 a second opening connected indirectly to the inlet of the supply channel;
 a third opening and means for removing allowing at least one portion of the fluid to be removed from the recirculation channel by the third opening connected to the exhaust line of the system.

The means for removal can be controlled or can be adjusted. Regardless of the current, it is therefore possible to control these means for removal; in other words, the latter are independent of the current from, or delivered by, the cell.

The recirculation channel connects the outlet of the discharge channel to the inlet of the supply channel in order to allow for the introduction in the supply channel of at least one portion of the fluid exiting from the discharge channel. The term "fluid" can designate a liquid and/or gaseous compound, comprising elements that chemically react to the contact of the electrode.

In the framework of this application, the term "connected" can designate two elements connected together in such a way that a fluid can circulate between said elements. The expression "indirectly connected" can for example designate one or several elements interposed between the supply channel and the recirculation channel and allowing at least one portion of the fluid exiting from the supply channel to enter said channel again.

Means of control can be provided in order to control the means for removal.

The means for removal can comprise a movable sealing member making it possible to distribute the quantity of fluid flowing through the second opening and the third opening of the recirculation channel.

The means for removal, for example the movable sealing member, make it possible to distribute the quantity of fluid flowing through the second opening and the third opening of the recirculation channel. These means for removal comprise for example a valve of the three-way type. A movable sealing member makes it possible to distribute the fluid between the different ways. It makes it possible to 'balance' the flow of reactants exiting through the discharge channel between the first and the second and the third opening.

The second opening of the recirculation channel can be connected to the inlet of the supply channel by the intermediary of a connector, comprising an opening allowing another fluid to mix with the fluid exiting from the recirculation channel through the second opening. In other words, a connector can comprise at least three openings, of which a first opening is connected to the second opening of the recirculation channel and a second opening is connected to the inlet of the supply channel.

The means for removal, for example the movable sealing member, can be controlled by a device of manual control, controlled by a user of the electrochemical cell, or by a control device, for example electromechanical; the latter can be for example controlled by a device or means of supervision.

The recirculation channel and/or the supply channel can comprise a compressor making it possible to control the flow rate of the fluid flowing therein. When, as explained hereinabove, a connector is present, the compressor can be connected or arranged upstream of one of the openings of the connector, between the latter and the inlet of the recirculation channel. A fluid is as such conveyed to the cathode. Preferably, in order to disturb as least as possible the operation of the compressor by the turbulences created by the mixing of the fluid with another fluid, the compressor is located as far as possible from said connector.

A compressor can be connected upstream or to the opening of the connector and/or a compressor can be connected to the recirculation channel between the outlet of the supply channel and the means for removal.

In other words, one or several compressors makes or make it possible to control the flow rates and/or the proportion of the fluids to be mixed in the connector.

The compressor or compressors make it possible to reach, at the inlet of the cell, a pressure less than or equal to 2 bar or between, on the one hand, 1 bar, or 1.2 bar or 1.3 bar or 1.5 bar, and, on the other hand, 2 bar.

Means of control can be provided in order to control the movable sealing member and/or at least one compressor.

According to an embodiment, the means for controlling comprise means for receiving at least one signal from at least one pressure sensor and/or from at least one temperature sensor and/or one flow rate sensor, and/or one oxygen concentration sensor and/or one humidity sensor and/or one signal from the electrical terminals of said electrochemical cell and/or of said cathode.

Means for memorizing and/or recording preceding measurements and/or orders coming from the electronic control device and/or means of calculation can be provided.

An outlet can make it possible to control the flow rate of the fluid flowing in the recirculation channel.

A communication interface can furthermore be provided.

A supply circuit according to the invention can be provided with from at least one pressure sensor, for example positioned in order to measure a pressure in the recirculation channel.

A supply circuit according to the invention can be provided with at least one temperature sensor.

A supply circuit according to the invention can be provided with at least one flow rate sensor, and/or one oxygen concentration sensor and/or one humidity sensor The supply circuit according to the invention can furthermore comprise a humidification device, which can for example be arranged as an interface between the inlet of the supply channel and the outlet of the discharge channel, in such a way as to be able to reinject a portion of the humidity exiting from the discharge channel to the supply channel.

The recirculation channel can comprise means that make it possible to control the quantity or the proportion of the elements transported by the fluid, making it possible for example to measure and/or to vary its rate of humidity by filtering a portion of the water transported by said fluid.

The number of recirculation channels connected to a fuel cell comprising the electrochemical cell can be between 1 and the number of supply channels including said cell.

A recirculation channel can collect the same fluid exiting from one or several supply channels, and distribute said fluid to the inlet of one or several supply channels.

An exhaust line can be connected to the third opening of the recirculation channel in order to allow for the removal of the fluid, for example in order to remove it to a desired distance from the electrochemical cell. The length of the recirculation channel that separates the first opening from the second and/or from the third opening can be between a few centimetres and several tens of centimetres, for example between 5 cm and 10 cm or 50 cm. For example, it can be between a few centimetres and 30 cm for fuel cells that produce 5 KW or more electrical energy, and between a few centimetres and 50 cm for that that produce more than 100 KW of electrical energy.

Possibly, the recirculation channel can be thermally insulated in order to preserve the thermal energy of the fluid passing through it.

One or several electrochemical cells hereinabove can form a fuel cell. Several electrochemical cells belonging to the same cell are preferably connected in series electrically and, from a fluid standpoint, in parallel.

As such, one or several electrochemical cells according to the invention can be arranged aboard a land or sea vehicle, in order to supply therein the traction chain, and/or one or several features on board, and/or to reload the means of storage of electrochemical energy (for example one or several batteries) or capacitive energy (for example one or several ultra-capacitors).

The invention therefore also relates to a land or sea vehicle comprising one or several electrochemical cells according to the invention.

One or several electrochemical cells according to the invention may not contain a voltage converter. For example one or several electrochemical cells according to the invention are arranged at the interface with a network, without a voltage converter.

One or several electrochemical cells according to the invention may not contain an auxiliary humidification device.

The invention also relates to a device for supplying an electrical network, comprising an electrochemical cell provided with at least one supply circuit according to the invention, or a cell according to the invention, without a voltage converter, and further comprising a current sensor for the interface with the network.

The invention also relates to an electrical network further comprising such a device for supplying according to the invention, with a current sensor being arranged between said cell and the network.

The invention also relates to a method for using an electrochemical cell hereinabove, or an electrochemical cell comprising a supply circuit according to the invention, with this method comprising a step of adjusting the means for removal, for example by changing the position of the movable sealing member, in such a way as to control the proportion of fluid coming from the discharge channel which is reintroduced into the supply channel of the same circuit. It is as such possible, via action on the means for removal, to modify said proportion of fluid.

The invention also relates to a method for using an electrochemical cell hereinabove or an electrochemical cell comprising a supply circuit according to the invention.

In particular, such a method can comprise a step of changing the operating state, using means for removing which are controlled, for example using a sealing member, and/or using one or several compressors mentioned hereinabove, in order to control the proportion of fluid reintroduced into the recirculation channel.

The invention also relates to a method for using at least one electrochemical cell comprising a supply circuit according to the invention or a cell according to the invention or a device for supplying according to the invention:
  the operating state of the compressor being modified in such a way that the temperature of the electrochemical cell is greater than or equal to 50° C.;
  and/or the means for removal being controlled according to the value of the electrical voltage at the terminals of the electrochemical cell and/or according to its internal temperature and/or in such a way that the temperature of the electrochemical cell is greater than or equal to 50° C.;
  and/or wherein the current supplied and/or the power supplied by controlling or by regulating or by adjusting the means for removal is varied, for example based on the signal provided by a current sensor.

A method of operating one or several electrochemical cells according to the invention, without a voltage converter (for example at the interface with a network), is very advantageous as it is without oscillation phenomena.

In a cellule according to the invention, when the fluid is placed into contact with the electrode, an exothermic reaction is produced and releases heat. A portion of this heat is evacuated from the electrochemical cell by the fluid exiting from the supply channel. Advantageously, the invention makes it possible to reintroduce at least one portion of this heat into the electrochemical cell by the intermediary of the recirculation channel. The temperature of the electrochemical cell can as such be more easily maintained and/or brought to a desired temperature according to the position of the movable sealing member and/or the operating state of one or of several compressors mentioned hereinabove.

Preferably, the electrochemical cell is heated via the irreversibilities of the electrochemical reaction, or perhaps maintained partially, by the fluid existing from the supply channel, at a temperature greater than or equal to 50° C., or in temperature ranges between 50° C. and 70° C., or between 50° C. and 95° C., or between 50° C. and 105° C. This temperature is the temperature in the cell, not (or not only) the inlet temperature of the fluids. During phases of low power, in particular on stand-by, for example when the cell is supplying only its auxiliaries, the heat generated is no longer sufficient to ensure the maintaining in temperature of the cell. If the temperature of the electrochemical cell leaves one of these ranges of temperatures, controlling the means for removing, for example by modifying the position of the movable sealing member, makes it possible to control the proportion of fluid coming from the supply channel and reintroduced into the same channel. In other words, the means for removal, for example the position of the movable sealing member, can be adapted so that the temperature of the electrochemical cell, in stand-by mode, is not less than 50° C., and this so that the electrochemical cell can respond rapidly to sudden demands from the customer environment. The recirculation channel then ensures a function of an enthalpy wheel, allowing for the recycling of a portion or of all of the thermal energy produced by the electrochemical cell. In addition, as the recirculation is carried out on the cathodic channel, the latter makes it possible to lower or increase the electrochemical irreversibilities and as such to regulate the heat that the latter produces, in particular with a partial charge.

The position of the movable sealing member can also be modified according to the state of the electrochemical cell and/or of the demand from the customer environment. For example, the position of the movable sealing member can be modified according to the value of the electrical voltage at the terminals of the electrochemical cell and/or of its internal temperature.

The compressor or compressors mentioned hereinabove can make it possible to control the proportion of the fluid coming from the discharge or recirculation channel which is reintroduced into an identical or different supply channel. For example, the flow rate of the fluid exiting from the discharge or recirculation channel can be modified according to the operating state of a compressor connected to the recirculation channel. According to this flow rate, the proportion of the mixture of fluid that can be carried out on the connector can be controlled.

By way of example, when the quantity of fluid reintroduced into the supply channel is increased, the concentration of the combustion agent transported by the fluid can be decreased. Because of this, the output of the electrochemical cell is reduced. The inverse effect can be obtained by increasing the quantity of fluid exiting by the third opening of the recirculation channel and/or by lowering the flow rate of the fluid exiting from the second opening of the recirculation channel by the intermediary of a compressor. In other terms, the controlling of the means for removing, for example the adjusting of the position of the movable sealing member and/or the operating state of one or several compressors hereinabove, can be adapted according to the demand from the customer environment, in order to be able to satisfy this demand in real time.

The controlling of the means for removing, for example the position of the movable sealing member and/or the operating state of a compressor hereinabove, as such makes it possible to control at will and at any time the proportion of combustion agents introduced into the supply channel according to the law of conservation of species or the law of conservation of mass, as well as the temperature of the electrochemical cell. The output of the electrochemical cell can in this way be controlled and adapted in real time according to the demand from its customer environment.

The invention can therefore make it possible to control, in real time, the polarisation curve of an electrochemical cell or of a cell comprising several electrochemical cells.

BRIEF DESCRIPTION OF THE DRAWINGS

Other details and characteristics of the invention shall appear in the following description, given in reference to the followed annexed figures.

Identical, similar or equivalent portions of the various figures bear the same references in such a way as to facilitate passing from one figure to another. The various portions shown in the figures are not necessarily shown according to a uniform scale, in order to render the figures more legible. The marks indicated in the figures are orthogonal.

FIG. 2B shows a longitudinal cross-section of an element belonging to the recirculation channel shown in FIG. 2a.

The FIGS. 5, 6A-6C show several embodiments of the invention.

Figure 7:
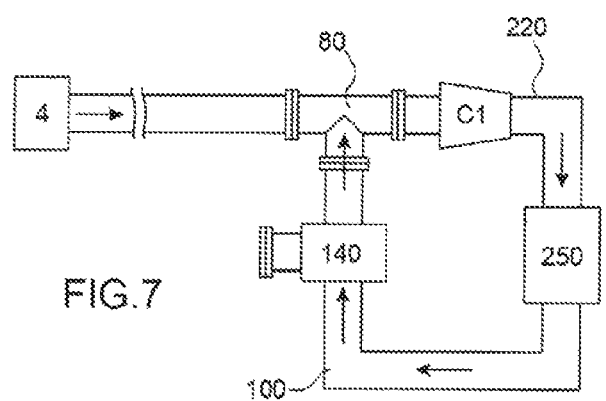

FIG. 7 shows an embodiment of the invention comprising one compressor.

Figure 8:
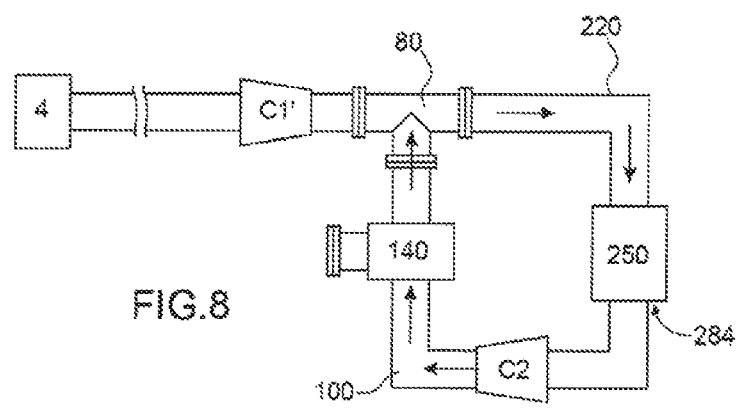

FIG. 8 shows an embodiment of the invention comprising two compressors.

Figure 9:
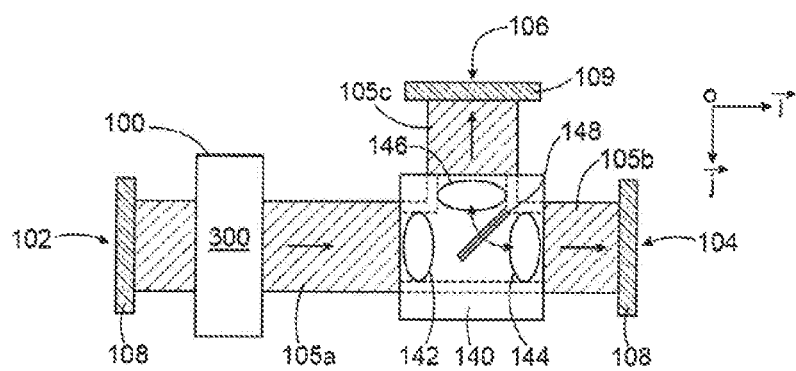

FIG. 9 shows an embodiment of the invention comprising a humidification device.

Figure 10:
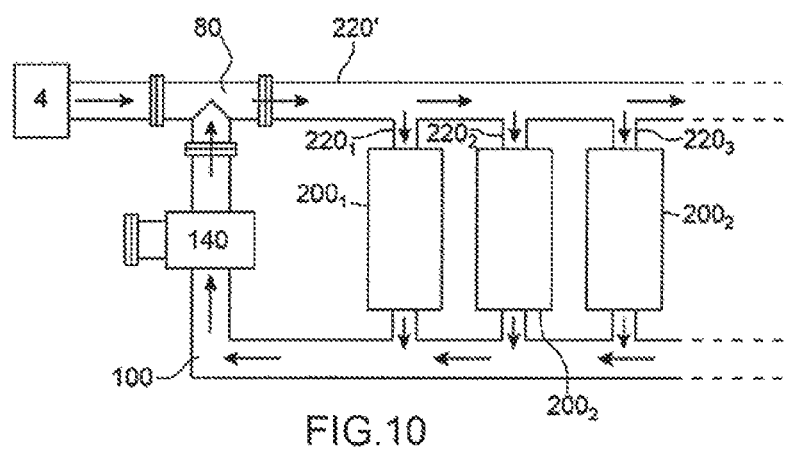

FIG. 10 shows an embodiment of the invention wherein a recirculation channel is connected to several electrochemical cells.

Figure 11:
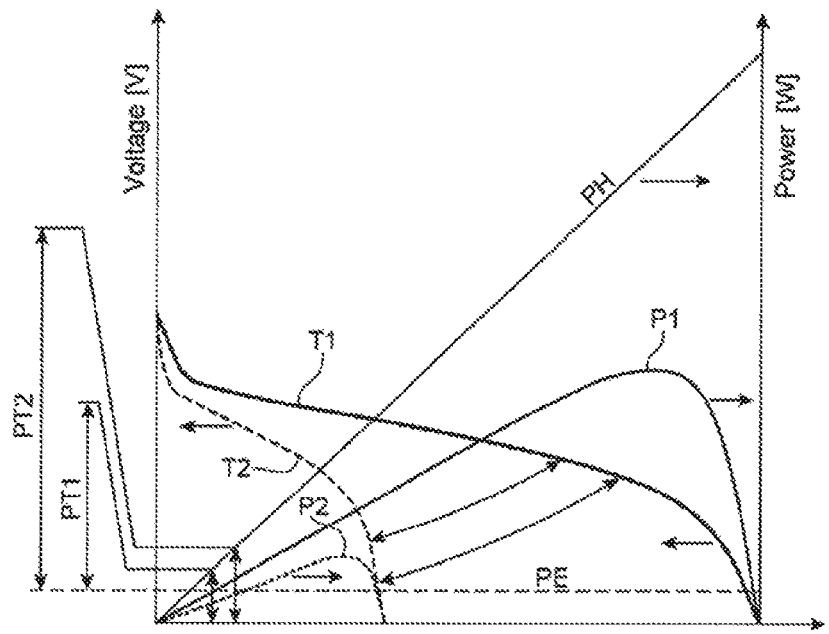

FIG. 11 shows the voltage and the electric power delivered by a fuel cell (solid lines) and a device according to the invention (dotted lines).

Figure 12A:
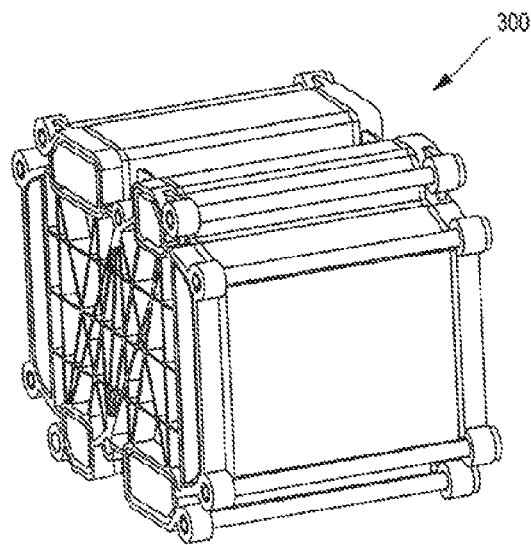
Figure 12B:
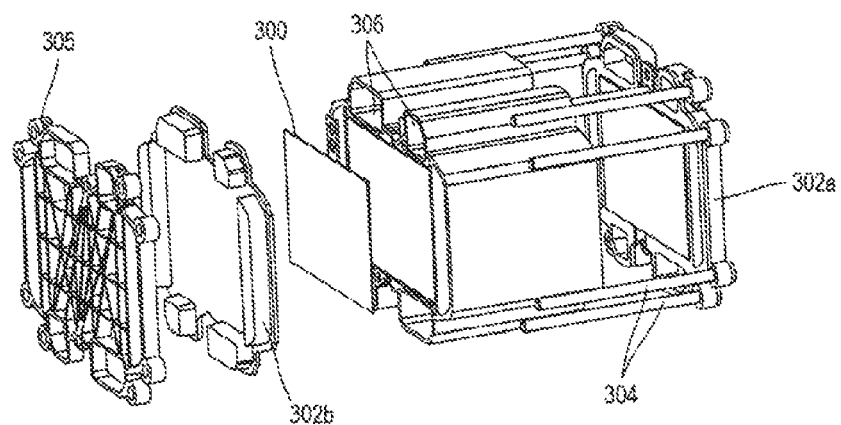
Figure 12C:
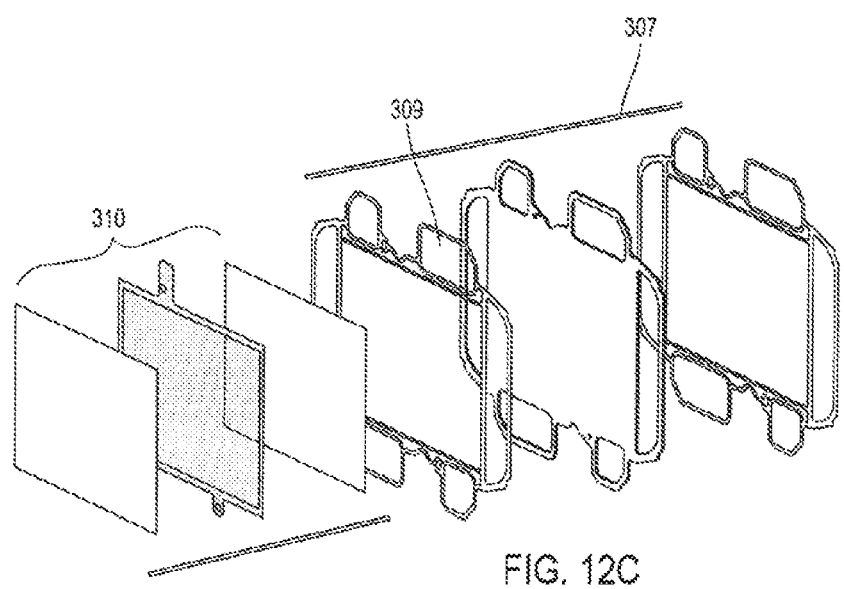

FIGS. 12a to 12c show a stack of electrochemical cells.

Figure 13:
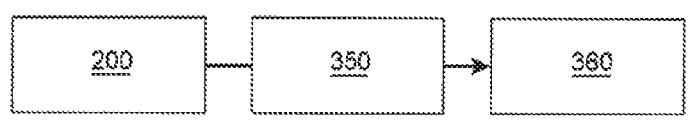

FIG. 13 shows a stack of electrochemical cells according to the invention, and a network.

DETAILED DISCLOSURE OF PARTICULAR EMBODIMENTS

The invention relates to an electrochemical cell of the PEMFC type or a cell of a stack of electrochemical cells of this type.

This cellule comprises in particular a recirculation channel that allows a fluid, exiting from a discharge channel belonging to the circuit of said cell or of said stack, to be reintroduced into said cell or said stack by the supply channel.

An example of a cell, or of a stack 300 of electrochemical cells, to which the invention can be applied, is given in FIGS. 12A-12C. Such a device comprises a unit 301 forming a stack of electrochemical cells; such a unit can furthermore comprise two end plates 302a, 302b. Means 304 for clamping can be provided, in order to maintain the unit in compression.

Each end plate can comprise a current collector ensuring the electrical liaison between the system and the two end cells of the stack. This component is made from an electrically conductive material and, more preferably, also ensures an electrical contact with said electrochemical cells, for example at a very low level of resistivity. This current collector is inserted into one of the electrically insulated end plates 302b that compresses the collector 303 against the end cells. Preferably said end plate integrated one fluid interface or interfaces that make it possible to connect one or several fluid loops of the system.

In order to ensure the mechanical resistance of the complete unit it is possible to implement a stiffener 305, that comes for example to press against the end plate 302b, as such reinforcing the mechanical resistance of the latter.

Means for closing can be provided, in order to maintain the desired compression of the electrochemical stack 300 between the current collectors 303. According to an embodiment, this unit for closing can comprise tie rods and/or straps.

Such a stack of electrochemical cells can comprise a channel or several channels for the discharge and intake of one or several fluids, for example a combustion agent fluid, and/or a fuel fluid and/or a cooling fluid, with each one passing through each cellule. The latter can be supplied in parallel thanks to said channels.

Each canal can result from the stack of cell. Indeed an electrochemical cell can comprise a bipolar plate 307 and an electrochemical core 310, comprising a membrane on each side of which an electrode is formed. These two elements can be perforated by one or several holes 309 having for function to allow for the passage of one or several supply and/or discharge fluids, from one cell to another. And the stack of these holes forms a channel or several supply and/or discharge channels of fluid allowing for the supply in parallel of each cellule.

Each cathode is of the closed type, i.e. it is supplied only by the supply channel. In order to facilitate the comprehension of the invention, the disclosure hereinbelow describes firstly an embodiment of a recirculation channel, then an embodiment of the invention comprising said canal, followed by several alternatives of the invention and finally a method for using the invention.

A recirculation channel 100 according to the invention allows for the introduction into a supply channel of an electrode or of a set of electrodes, belonging to an electrochemical cell or to a stack of electrochemical cells, of a fluid exiting from said cell or said cells in the discharge channel. The term fluid 90 or combustion agent designates all elements, in gaseous and/or liquid form, that make it possible to increase and/or decrease the output of an electrochemical reaction taking place on the surface of an electrode belonging to the electrochemical cell. For example, for a hydrogen fuel cell, the fluid 90 placed into contact with a cathode preferentially comprises oxygen, and possible water and nitrogen. The means that make it possible to place into contact the fluid 90 with an electrode are called hereinbelow supply and discharge channel 220 and 280. A first example of a recirculation channel 100 shall now be described.

Figure 1:
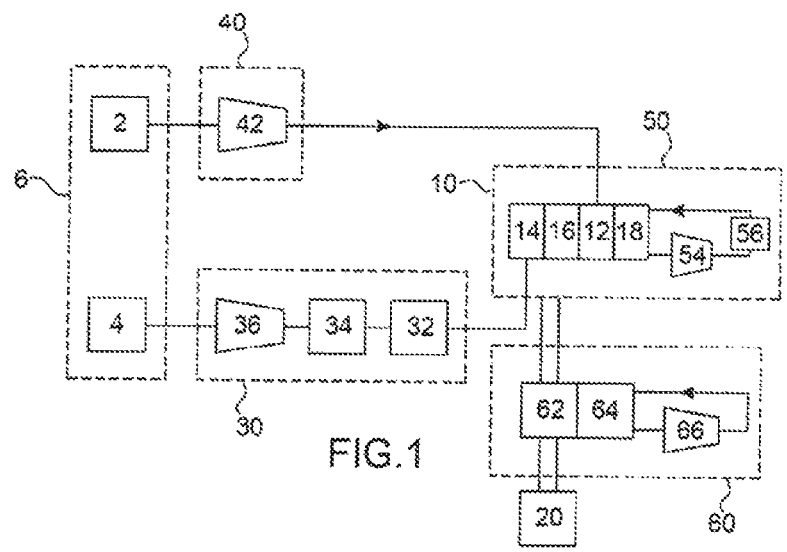
FIG. 1 shows a fuel cell and its auxiliary modules that ensure its operation.
Figure 2A:
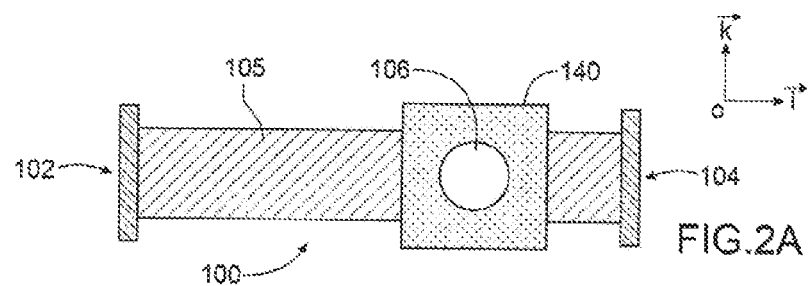
FIG. 2A shows a recirculation channel.
Figure 2B:
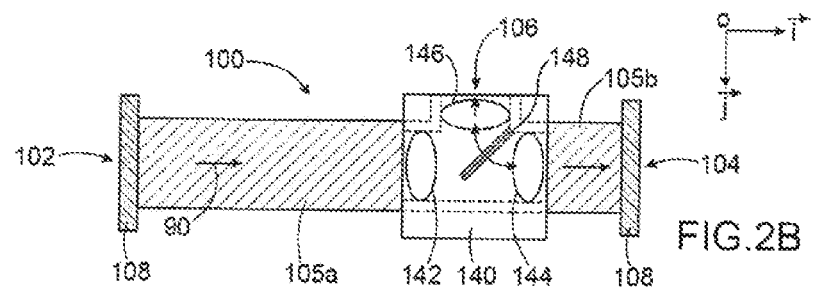

According to this example, shown in FIGS. 2a and 2b, a recirculation channel 100 which comprises a first opening 102 and a second opening 104 connected by a canal 105.

This channel extends substantially longitudinally, along an axis Ox. It is delimited by a wall 105, sealed or at least partially sealing the fluid 90. The length of the channel connecting the openings 102 and 104 can be between a few centimetres and several metres or between a few centimetres and several decimetres, for example between, on the one hand, 1 cm or 5 cm and, on the other hand, 50 cm or 1 m or 5 m.

The section of the channel 105, defined in a plane perpendicular to its length, can be of circular shape. But it can have another shape, for example oval, or rectangular or square. The maximum dimension of this section can be between a few centimetres and several decimetres, for example between, on the one hand, 1 cm or 5 cm and, on the other hand, 10 cm or 50 cm.

The recirculation channel 100 comprises means or a device for removing 140, making it possible to remove, outside of the channel 105, by the intermediary of a third opening 106, arranged laterally in relation to the channel, at least one portion of the fluid 90 circulating in the latter.

These means for removal 140 comprise here:
- a first passage or a first inlet 142, connected to the first opening 102 by a first portion 105a of the channel 105, arranged upstream of the means 140 in relation to the direction of circulation of the fluid;
- a second passage or a first outlet 144, connected to the second opening 104 by a second portion 105b of the channel 105, arranged downstream of the means 140 in relation to the circulation of the fluid;
- a third passage or a second outlet 146, corresponding in this example to the third opening 106.

For example a movable sealing member 148 makes it possible to distribute the fluid 90, which has entered into the channel by the first opening 102, between the second opening 104 and the third opening 106.

In other terms, the device for removing 140 comprises a valve, or operates like a valve, of the three-way type. The arrows of FIG. 2B indicate the direction of flow of the fluid in the recirculation channel 100.

Figure 2C:
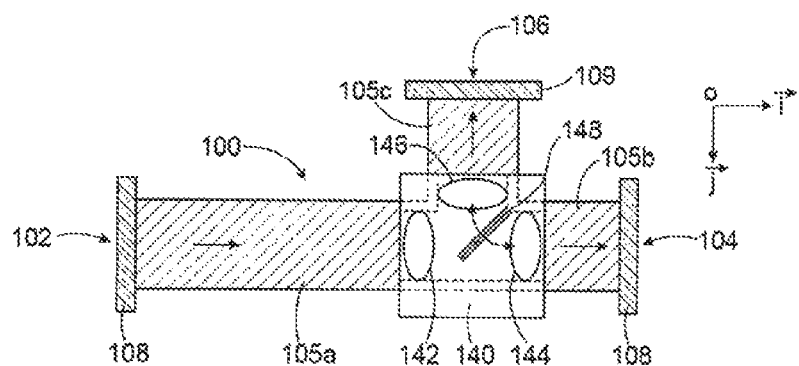
FIG. 2C shows an alternative of the recirculation channel shown in FIG. 2B.

The means for removal, for example the position of the movable sealing member 148, can be controlled by a device of manual control (not shown in the figures), allowing a user to reversibly control and at will the proportion of the fluid flowing between the second opening and the third opening of the recirculation channel 100. Possibly, and as shown in FIG. 2C, the second outlet 146 of the device for removing 140 is extended by a portion 105c of a channel 100 in such a way as to form an exhaust line making it possible to move the third opening 106 of the wall away from the recirculation channel 105.

Preferably, the exhaust line positions the opening 106 outside of the fuel cell comprising the electrochemical cell or the stack of electrochemical cells 200.

Regardless of the embodiment considered for the recirculation channel 100, the latter is more preferably carried out in deformable or flexible materials in order to facilitate its connection to an electrochemical cell, as explained hereinbelow.

The wall of the recirculation channel can be comprised of organic materials (polymers) or inorganic materials (metals). For example the recirculation channel can be comprised of a mono-block hose, moulded in silicone, more preferably semi-rigid.

The recirculation channel 100 can comprise means that make it possible to minimise the thermal losses by its wall. For example, the external surface of the wall can be covered with an insulating material, such as expanded foam. In this way, the heat of a fluid is preserved during its passage in the recirculation channel.

An embodiment of a supply circuit according to the invention, comprising a recirculation channel such as hereinabove, is described in liaison with FIG. 3.

In this figure, is shown a cell comprising an anode 210, a cathode 250, and a membrane 290, interposed between the cathode is the anode. This membrane 290 is impermeable to the reactant fluids and to the electrical charges but permeable to protons. The membrane exchanges protons and comprises an electrolyte), and primarily ensures the transfer of the molecules of oxidised fuel. It is also called PEMFC for "Proton Exchange Membrane Fuel Cell", and makes it possible to physically separate the fuel from the combustion agent when they are introduced into their respective compartments in the electrochemical cell. For example, for a fuel cell of the PEMFC type the fuel is hydrogen, the combustion agent is oxygen.

The anode 210 is supplied with fuel, by a source of gaseous hydrogen that can be under high pressure (for example at a pressure less than or equal to 700 bar, for example between 100 bar, or 400 bar, or 500 bar, and 700 bar) or by a source of hydrogen with a pressure substantially in the vicinity of atmospheric pressure, for example a source of liquid cryogenic H. A reforming device in order to generate hydrogen is not necessary.

Each one of these embodiments can have an application in the automobile field.

A particularly interesting embodiment is that of a supply of the cathode with air, at atmospheric pressure; this embodiment also has an application in the automobile field.

The device therefore comprises means for supplying the anode with fuel (hydrogen) which makes it possible to provide hydrogen at the pressures indicated hereinabove. It comprises means for supplying the cathode, which makes it possible to provide air or oxygen at the pressures indicated hereinabove.

The reference 6 designates a storage module, with fuel and with combustion agent. The reference 10 designates the production module comprising at least one electrochemical cell supplied using said storage module.

The cathode 250 is supplied with a combustion agent, in general air, from a reservoir 4 or from atmospheric air. More precisely, the combustion agent is conveyed from this reservoir by a supply channel 219, a connector 80, then a supply channel 220 of the cathode.

Figure 3:
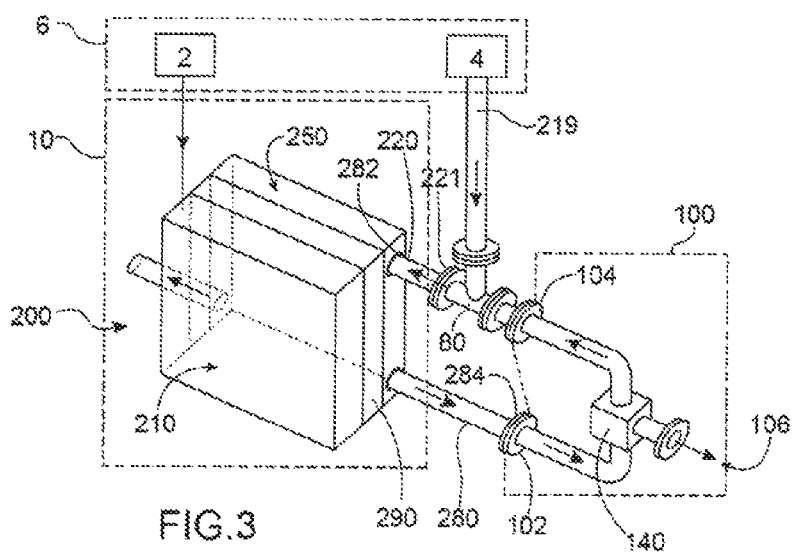
FIG. 3 shows an embodiment of the invention comprising an electrochemical cell shown in FIG. 3, connected to a recirculation channel shown in FIG. 2C.

In the cathode, the fluid, poor in oxygen consumed by the electrochemical reaction, is then directed to a discharge circuit 280, of which a portion can be seen in FIG. 3.

In FIG. 3 the arrows indicate the circulation of the reactant fluid 90 in the channels, before the inlet of the stack, and at the outlet of the stack.

A recirculation channel 100 of the type described hereinabove, for example the one described in liaison with FIG. 2C, is connected to the electrochemical cell or to a stack of electrochemical cells in the following manner.

The outlet 284 of the discharge channel 280 of the cathode 250 is connected to the first opening 102 of the recirculation channel 100 and the second opening 104 of the recirculation channel is connected (here indirectly) to the inlet 221 of the supply channel 220 by the intermediary of the connector 80. The latter comprises:
  a first opening connected to the second opening 104 of the recirculation channel;
  a second opening connected to the inlet 221 of the supply channel 220;
  a third opening for the introduction of the fluid coming from the reservoir 4.

One or several pressure sensors can be positioned in the circulation channel 100. One or several temperature sensors can also be arranged in this channel, for example in the vicinity of the pressure sensors.

At least one flow rate sensor, and/or one oxygen concentration sensor and/or one humidity sensor can be arranged in one of the channels.

Several alternatives of the device hereinabove are described hereinafter, these alternatives can be combined together in order to obtain other embodiments.

According to a first alternative, the recirculation channel 100 and the connector 80 form a single part.

According to another embodiment of the invention, the openings 102 and 104 of the recirculation channel comprise means for fastening that make it possible to facilitate the connection of the recirculation channel 100 to the inlet and to the outlet of a supply channel 280. These means make it possible for example to carry out a crimping or a gluing or an overmoulding of the opening 104 around a portion of the connector 80.

According to yet another alternative of the device described hereinabove, in order to improve the seal of the device, one or several O-rings, or flat seals, are inserted between the various elements connected together.

Figure 4:
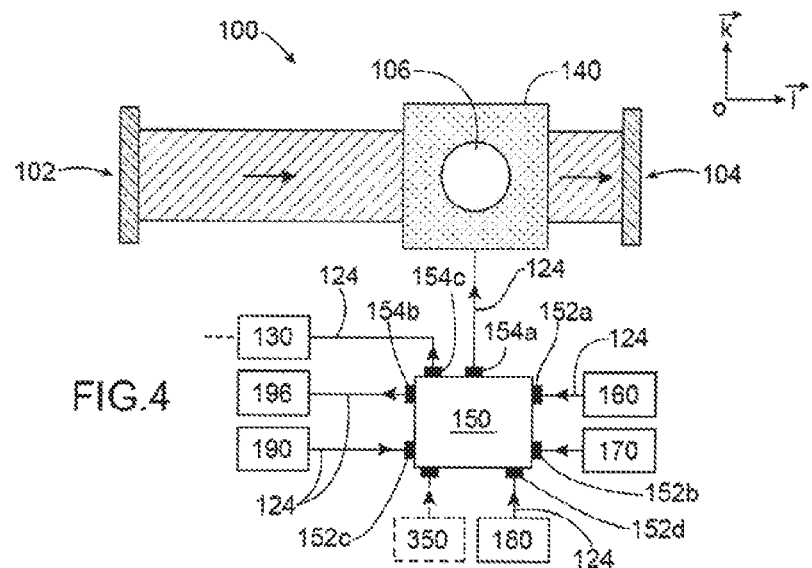
FIG. 4 shows an alternative of a recirculation channel shown in FIG. 2A.
Figure 5:
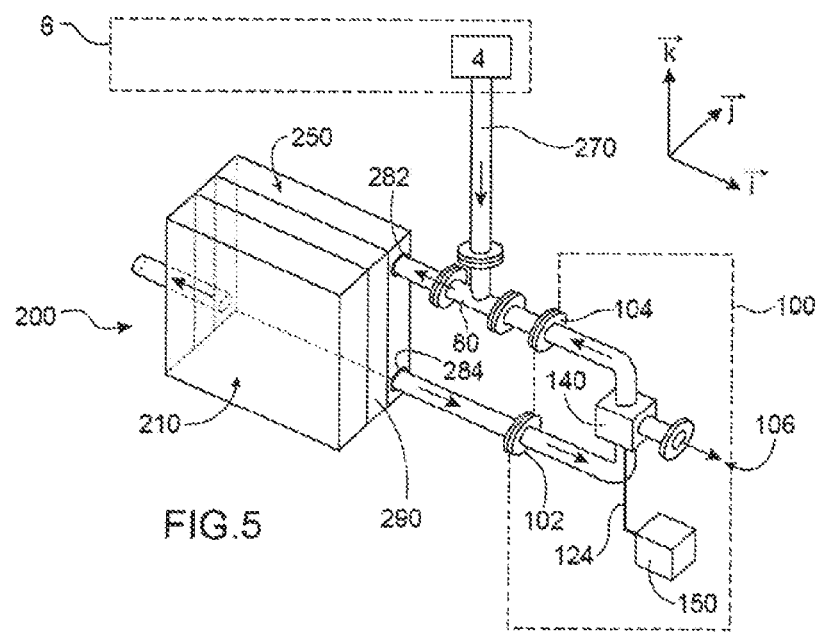

According to yet another alternative, the means 140 are controlled by means 150 for controlling, comprising for example an electronic device (FIGS. 4 and 5). These means 150 comprise for example a computer or a microprocessor or a processor, possibly programmed to implement a controlling of the means 140. Alternatively these means 150 comprise a device that can read a hardware support (for example a USB key or any other type of memory) whereon is recorded a program, in order to implement a controlling of the means 140.

For example the position of the movable sealing member 148 can be modified by these means 150.

These means 150 for controlling (also called bottom supervision device) can comprise:
  at least one inlet 152a allowing the electronic system 150 to receive at least one signal;
  means for memorising signals;
  means for calculating;
  at least one outlet 154a connected to means 140 that make it possible to control the position of the movable sealing member 148.

The means for controlling 150 can also comprise an outlet 154b connected to a communication interface 196, of the display screen type. An inlet 152c can also be connected to a communication interface 190, of the computer keyboard type, allowing an operator to enter information into the device 150. The electronic system 150 can be a device of the computer or micro-computer type.

An inlet 152*a* of the means for controlling can be connected to at least one pressure sensor 160, for example positioned in the recirculation channel 100.

An inlet of the means for controlling can be connected to at least one current sensor 350 which can themselves be arranged, as explained hereinbelow (FIG. 13), between a cell according to the invention and an electrical network 360 supplied as such.

At least one temperature sensor 170 can be connected to an inlet 152*b* of the means for controlling 150. The temperature sensor or sensors can be positioned in the vicinity of the pressure sensors. Preferably, at least one temperature sensor 170 can be positioned in contact or in the vicinity:
- of the electrode;
- and/or of its support plate, for example the plate 302*b*, more preferably in the vicinity of the discharge channel
- and/or of a device that allows for the cooling of said support plate;
- and/or of the fuel cell comprising said electrode.

The means for controlling 150 can comprise at least one other inlet 152*d*, that can be connected to the electrical terminals of the fuel cell and/or to the cathode 250. A regulation in current is then carried out.

The means for controlling 150 can communicate with the other means, and in particular the means 140, for example with the movable sealing member, or its means for positioning, and/or with the means for controlling of a compressor, by the intermediary of means 124. These means can be conducting elements (metals wires) or means of communication using radiofrequency waves (wifi, RFID). These means 124 allow for the communication of a signal, for example electrical pulses, between two devices.

Possibly, other means 180, referred to a "top" supervision devices, can be provided in order to control the operation of the means for control 150. Alternatively, a top supervision is carried out by an operator or via the demand for electrical energy from the customer environment.

Figure 6A:
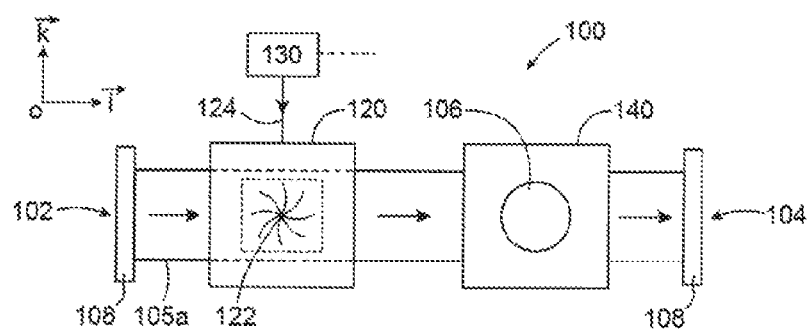
Figure 6B:
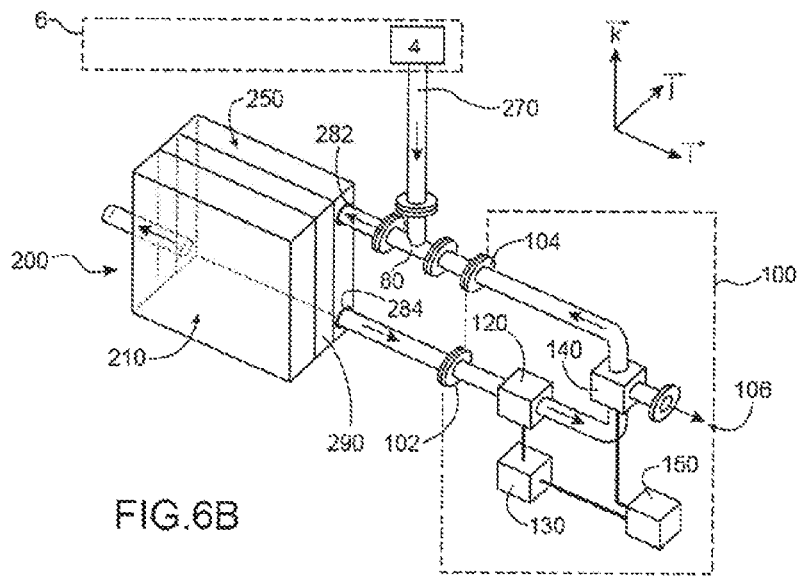
Figure 6C:
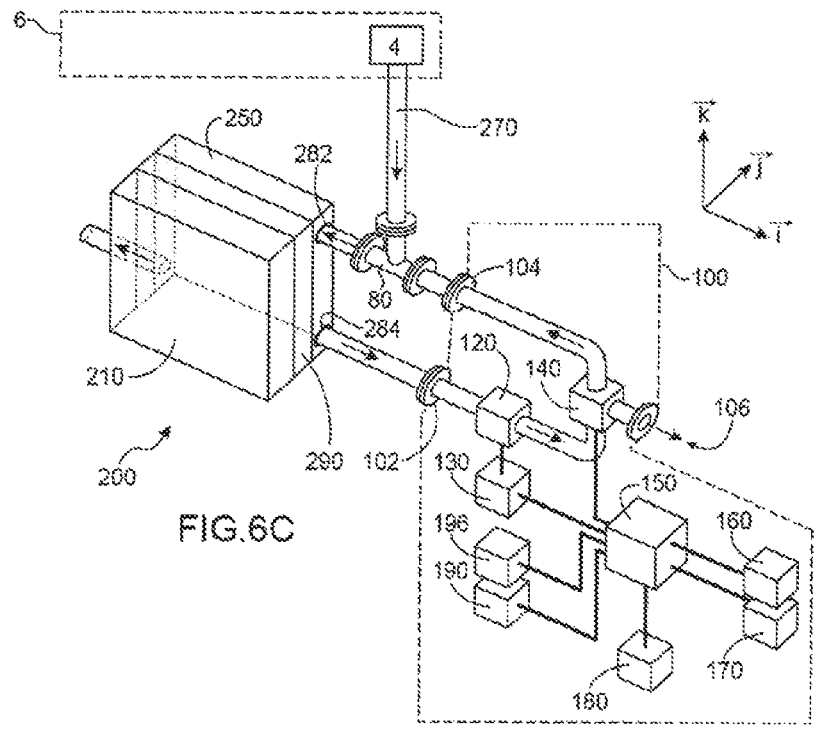

As already explained hereinabove, a recirculation channel can comprise a compressor 120 (FIGS. 6A, 6B and 6C). For example, this one comprises a propeller 122 of which the speed and the direction of rotation can be controlled by the means 150 for controlling, for example by the intermediary of a device for controlling 130 (this can be the inverter or the variator that supplies it) which is itself connected to the means for controlling 150 by the intermediary of means for communicating 124. The means for controlling 150 can be connected to means 154*c* that make it possible to measure the pressure of the fluid in the channel 105, with the means 150 then making it possible to control the pressure of the fluid in the channel 105.

The compressor device 120 makes it possible to displace the fluid from the first opening 102 to the second opening 104 and/or the third opening 106. Preferably, the compressor is placed between the first opening 102 and the device for removing 140 so that the pressure of the fluid 90 is greater in the upstream portion 105*a* of the channel 105 than in its downstream portion 105*b*.

Alternatively, a compressor (C1) can be placed between the connector 80 and the inlet of the supply channel 220 in order to inject the fluid under pressure in this channel (FIG. 7). The outlet 104 of the recirculation channel is more preferably connected upstream and as far away as possible from said compressor which makes it possible to homogenise the mixture that is carried out in the connector 80.

Possibly, a compressor (C1') is connected upstream of the opening of the connector 80, allowing another fluid, here air coming from an outside environment or from the reservoir 4, to mix with the fluid, oxygen reduced and coming from the recirculation, and another compressor (C2) is connected to the recirculation channel between the outlet 284 of the discharge channel and the means for removal 140.

According to another alternative of one of the preceding devices, shown in FIG. 9, a humidification device 300 can be interposed between the first and the second opening of the recirculation channel 100 in such a way as to be able to reinject the humidity exiting from the discharge channel to the inlet of the intake channel According to an alternative, and as shown in FIG. 10, the invention also relates to a joint recirculation channel 100' connected, for example by the intermediary of a connector 80, to a supply channel 220' starting from which several supply channels $220_1$, $220_2$, $220_3$, make it possible to supply different cells $200_1$, $200_2$, $200_3$, stacked as explained in liaison with FIGS. 12A-C. Each one of these cells has a structure such as described hereinabove in liaison with FIG. 4. This recirculation channel 100' makes it possible to recover the fluid exiting from the discharge channels of the various cells and to reinject at least one portion of this fluid at the inlets of the intake channels of the cells.

The recirculation channel 100' has the same structure as those that were described hereinabove, for example in liaison with FIG. 2A-2C or 6A.

The recirculation then takes place as described hereinabove in liaison with the other embodiments.

In other words, the invention applies not only to an individual cell, but also to a stack of cells.

A method for using one of the devices hereinabove is described hereinafter.

In FIG. 11, the solid curves represent the voltage T1 and the power P1 delivered by a hydrogen cell comprising an electrochemical cell. The power contained in the hydrogen consumed is shown by the curve PH. The dotted line PE indicates the level of electric power required in order for the cell to operate. A portion of the hydrogen consumed thus releases heat according to the electrochemical reaction (2) hereinabove. The power released in the form of heat (PT1) corresponds to the difference between the curves PH and PE.

A recirculation channel such as described hereinabove makes it possible to reintroduce at least one portion of the fluid into the supply channel of the cathode of the hydrogen cell. This has for effect to introduce a fluid comprising less oxygen, more water molecules and a portion of the thermal energy transferred during the electrochemical reaction (2).

Because of this, the output of the reaction (2) is limited by the lack of combustion agent or more precisely the drop in the concentration of combustion agent elements, here the oxygen in this case. The electrical voltage and the power of the cell thus drop, the curves T1 and P1 are replaced with curves T2 and P2 respectively. This drop can be controlled according to the proportion of the reactant gas reintroduced into the supply channel. The performance of the cell can then be reduced or decreased according to the position, for example, of the movable sealing member 148 in the removal system 140.

For the same level of electric power required, the fuel cell can then consume more hydrogen, according to the electrochemical reaction (2), when it is connected to a recirculation channel hereinabove (PT2). As the electrochemical reaction (2) is exothermal, an increase in the quantity of hydrogen consumed in the cathode causes an increase in the temperature of said cathode. The recirculation channel as such makes it possible to control the proportion of heat produced during the electrochemical reaction (2). It is then possible to maintain or to increase in temperature the electrochemical cell of a fuel cell when the latter is in stand-by mode, with a low charge or possible when stopped.

An operator, or the means 150 for controlling, can control the means 140, for example the position of the movable sealing member 148 (FIG. 4), in such a way as to adapt the proportion of fluid reinjected into the supply channel. The electric power delivered by the electrochemical cell can be controlled according to the adjusting of the means 140, for example the position of the movable sealing member 148 in the device for removal 140. The phenomenon of current oscillation can then be attenuated, and even suppressed.

Advantageously, the invention makes it possible to recover at least one portion of the heat produced by an electrochemical cell, in order to reintroduce it into the same electrochemical cell.

As such, the invention can make it possible to more easily maintain an electrochemical cell in a temperature range between 50° C. and 70° C., or between 50° C. and 95° C., or between 50° C. and 105° C., even in stand-by mode.

The invention can also make it possible to increase the temperature of an electrochemical cell when stopped, connected at least partially to an electrochemical cell in operation, by the intermediary of one of the preceding recirculation channels.

Advantageously, the electrochemical cell is maintained in a temperature range that is favourable for allowing said electrochemical cell to respond to sudden demands from the customer environment. It is then no longer necessary to use a voltage converter, which means a decrease in the volume of the device and a reduction in the cost of manufacturing it with regards to prior art.

A fuel cell can comprise several electrochemical cells described hereinabove, connected in series.

Another advantage of the invention is to be able to rehydrate a PEMFC membrane by taking the water produced by an electrochemical cell, in order to introduce it again into the electrochemical cell. It is then no longer useful to have recourse to auxiliary humidification devices for reactant fluids, which are bulky devices and which consume a portion of the energy produced by the cell.

The suppression of the auxiliary modules hereinabove makes it possible in particular to suppress the risks of damaging the electrochemical cell by the current oscillations induced by these modules.

Indeed, the other advantage of the invention is to be able to eliminate the phenomena of current oscillation which generally induce an irreversible degradation of the fuel cell by the suppression of their sources which are generally active power electronic components such as DC/DC converters, ensuring the interface between the supplied network and the fuel cell, when the operating voltage range of the fuel cell can be matched with the voltage of the network that it has to supply.

The matching can take place on the fuel cell by the number of cells (200) stacked.

However, in order to be possible, a controlling of the power delivered by the cell, initially carried out by the suppressed electronic interface components, must be carried out.

As such the invention has the advantage of also making it possible to ensure this controlling while still allowing the fuel cell to be supplied in a sustainable manner. Indeed, as can be understood in FIG. 11, the control of the means for removal 140, for example the position of the movable sealing member 148, makes it possible to modify the voltage/current curve and therefore to modulate the power supplied. As the operating voltage of the fuel cell it imposed on it by the network to which it connects, an operator, or the means for controlling 150, can control the current supplied and/or the power supplied by controlling the means for removal 140, for example the position of the movable sealing member 148; this controlling can be carried out in a closed loop, via a current sensor 350 located between 200 and 300 connected to the means for controlling 150.

FIG. 13 diagramatically represents one or several electrochemical cells 200 according to the invention, at the interface with a network 360, without a voltage converter.

FIG. 4 shows the connection of this sensor 350 with the means for controlling 150.

What is claimed is:

1. A supply circuit of a cathode of at least one electrochemical cell of the PEMFC type, which further comprises a membrane separating an anode and said cathode, with this circuit comprising:
   a cathode supply duct configured to convey a fluid in contact with the cathode, the cathode supply duct comprising an inlet and an outlet, the outlet of the cathode supply duct being directly connected to the cathode;
   a discharge duct configured to remove gases from the electrochemical cell, the discharge duct comprising an inlet and an outlet, the inlet of the discharge duct being directly connected to the cathode;
   an intermediary duct having first and second inlets, and an outlet, the first inlet configured to receive a combustion agent fluid and the outlet of the intermediary duct being directly connected to the inlet of the cathode supply duct;
   a reservoir configured to store the combustion agent fluid therein for downstream use;
   a combustion agent duct configured to convey the combustion agent fluid stored in the reservoir to the intermediary duct, the combustion agent duct having one end directly connected to the reservoir and another end directly connected to the first inlet of the intermediary duct;
   a first compressor positioned within the combustion agent duct such that the first compressor is fluidly located upstream of the first inlet of the intermediary duct, the first compressor configured to control a pressure of the combustion agent fluid within the combustion agent duct;
   a recirculation duct delimited by a wall at least partially sealing the fluid, comprising:
      a first opening directly connected to the outlet of the discharge duct;
      a second opening directly connected to the second inlet of the intermediary duct, said intermediary duct making it possible to mix the combustion agent fluid with the fluid exiting from the recirculation duct by the second opening;
      a third opening and a movable sealing member allowing at least one portion of the fluid to be removed from the recirculation duct by the third opening; and
   a second compressor positioned within the recirculation duct or the cathode supply duct, the second compressor configured to control the flow rates and/or the proportion of the fluids to be mixed in the intermediary duct, wherein the first compressor only receives the combustion agent fluid stored in the reservoir, and is incapable of receiving the fluid that has passed through the cathode.

2. The supply circuit according to claim 1, further comprising an electronic controller controlling said movable sealing member.

3. The supply circuit according to claim 1, said movable sealing member making it possible to distribute the quantity of fluid flowing through the second opening and the third opening of the recirculation duct.

4. The supply circuit according to claim 1, the cathode supply duct further comprising at least one compressor.

5. The supply circuit according to claim 1, further comprising an electronic controller controlling at least one compressor.

6. The supply circuit according to claim 2, said controller comprising at least one input for receiving at least one signal from at least one pressure sensor and/or from at least one temperature sensor and/or one flow rate sensor, and/or one oxygen concentration sensor and/or one humidity sensor and/or one signal from the electrical terminals of said electrochemical cell and/or of said cathode and/or the signal from a current sensor.

7. The supply circuit according to claim 1, further comprising at least one of a pressure sensor, a pressure sensor being positioned in the recirculation duct, a temperature sensor, and a humidifier.

8. A fuel cell comprising a plurality of electrochemical cells and at least one supply circuit according to claim 1.

9. A device for supplying a current or power to an electrical network, comprising an electrochemical cell provided with at least one supply circuit according to claim 1, without a voltage converter, and further comprising a current sensor for the interface with the network.

10. A device for supplying a current or power to an electrical network, comprising an electrochemical cell provided with at least one fuel cell according to claim 8, without a voltage converter, and further comprising a current sensor for the interface with the network.

11. A method for using at least one electrochemical cell comprising a supply circuit according to claim 1, said method comprising at least one of:
  modifying the operating state of the second compressor so that the temperature of the electrochemical cell is equal to or greater than 50° C.;
  controlling the movable sealing member according to the value of the electrical voltage at the terminals of the electrochemical cell and/or to its internal temperature and/or in such a way that the temperature of the electrochemical cell is equal to or greater than 50° C.

12. A method for using at least one electrochemical cell comprising a supply circuit according to claim 1, wherein the current and/or the power supplied is made to vary by controlling the movable sealing member.

13. The supply circuit according to claim 1, further comprising an electronic controller controlling said movable sealing member according to an internal temperature of the electrochemical cell.

14. The supply circuit according to claim 1, further comprising an electronic controller controlling an operating state of the at least one compressor in such a way that a temperature of the electromechanical cell is greater than or equal to 50° C.

15. The supply circuit according to claim 1, further comprising an electronic controller programmed to control the movable sealing member, the first compressor, and the second compressor.

* * * * *